(12) United States Patent
Houle

(10) Patent No.: US 8,167,752 B2
(45) Date of Patent: May 1, 2012

(54) HYBRID TRANSMISSION FOR HYBRID VEHICLES

(75) Inventor: Martin Houle, Laval (CA)

(73) Assignee: TM4 Inc., Quebec (CA)

( * ) Notice: Subject to any disclaimer, the term of this patent is extended or adjusted under 35 U.S.C. 154(b) by 611 days.

(21) Appl. No.: 12/281,711

(22) PCT Filed: Mar. 14, 2007

(86) PCT No.: PCT/CA2007/000424
§ 371 (c)(1),
(2), (4) Date: Jan. 12, 2009

(87) PCT Pub. No.: WO2007/104161
PCT Pub. Date: Sep. 20, 2007

(65) Prior Publication Data
US 2009/0221390 A1    Sep. 3, 2009

Related U.S. Application Data

(60) Provisional application No. 60/782,300, filed on Mar. 15, 2006.

(51) Int. Cl.
*F16H 3/72* (2006.01)
*F16H 37/06* (2006.01)
*F16H 48/06* (2006.01)
(52) U.S. Cl. .................... 475/5; 475/149
(58) Field of Classification Search ............... 475/149, 475/150, 151, 269, 305
See application file for complete search history.

(56) References Cited

U.S. PATENT DOCUMENTS

| | | | |
|---|---|---|---|
| 5,558,558 A * | 9/1996 | Bory et al. ................. | 451/11 |
| 5,558,588 A | 9/1996 | Schmidt | |
| 6,405,818 B1 * | 6/2002 | Anthony et al. ............ | 180/65.8 |
| 6,679,796 B2 | 1/2004 | Sugano | |
| 6,691,809 B2 | 2/2004 | Hata et al. | |
| 6,702,709 B2 | 3/2004 | Bowen | |
| 6,965,824 B2 * | 11/2005 | Ichimoto et al. ............ | 701/113 |
| 7,513,349 B2 * | 4/2009 | Houle et al. ................ | 192/48.2 |
| 7,607,499 B2 * | 10/2009 | Egami ..................... | 180/65.265 |
| 7,686,723 B2 * | 3/2010 | Schondorf .................. | 475/5 |
| 7,694,760 B2 * | 4/2010 | Leone et al. ............... | 180/65.21 |
| 2004/0149501 A1 * | 8/2004 | Imazu et al. ............... | 180/65.2 |
| 2005/0035601 A1 * | 2/2005 | Dyck et al. ................ | 290/7 |
| 2005/0061564 A1 * | 3/2005 | Kuang et al. ............... | 180/65.2 |
| 2005/0133286 A1 | 6/2005 | Oshidari | |
| 2005/0202929 A1 | 9/2005 | Tsuneyoshi et al. | |

FOREIGN PATENT DOCUMENTS

| | | |
|---|---|---|
| EP | 1 090 792 | 4/2001 |
| EP | 1 538 014 | 6/2005 |
| WO | 2007/0110721 | 10/2007 |

* cited by examiner

*Primary Examiner* — Roger L Pang
*Assistant Examiner* — Michael Gonzalez
(74) *Attorney, Agent, or Firm* — Fay Kaplun & Marcin, LLP

(57) ABSTRACT

A hybrid transmission described herein comprises a planetary gear arrangement and a clutch including two electromagnetic clutch portions used to interconnect an internal combustion engine, an electric traction motor, an electric motor/generator and driving wheels of a hybrid vehicle. The hybrid transmission described herein allows various modes of operation.

15 Claims, 7 Drawing Sheets

HYBRID TRANSMISSION FOR HYBRID VEHICLES

This is a 371 of PCT/CA2007/000424 filed on Mar. 14, 2007 which claims priority to U.S. Provisional Patent Appln. Ser. No. 60/782,300 filed on Mar. 15, 2006.

FIELD

The present disclosure relates to hybrid vehicles. More specifically, the present invention is concerned with a hybrid transmission for a hybrid drive train of hybrid vehicles.

BACKGROUND

Hybrid vehicles are well known in the art. They are usually provided with an internal combustion engine (ICE), an electric traction motor that may transmit power to at least one wheel of the vehicle and an electric motor/generator used to supply electricity to the traction motor and/or to recharge batteries of the vehicle and/or to transmit power to at least one wheel of the vehicle.

A hybrid vehicle is said to be a series hybrid vehicle when the traction motor is used to drive the wheels and the ICE is exclusively used to drive the electric generator to recharge the vehicle's batteries and/or supply electric power directly to the traction motor.

A hybrid vehicle is said to be a parallel hybrid vehicle when both the traction motor and the ICE may be used simultaneously or individually to drive the wheels of the vehicle. In parallel hybrid vehicles, the ICE may also be used to recharge the batteries through the electric generator.

Series/parallel hybrid vehicles (SPHV) are also known in the art. Conventionally, these vehicles include drive trains that may be switched between a series mode and a parallel mode, as described hereinabove. SPHVs combine the series hybrid system with the parallel hybrid system in order to maximize the benefits of both systems. These vehicles generally have an electric motor and an electric generator, and depending on the driving conditions, use only the electric motor or the driving power from both the electric motor and the engine, in order to achieve the highest efficiency level. Furthermore, when necessary, the system drives the wheels while simultaneously generating electricity using a generator.

DETAILED DESCRIPTION

Figure 1:
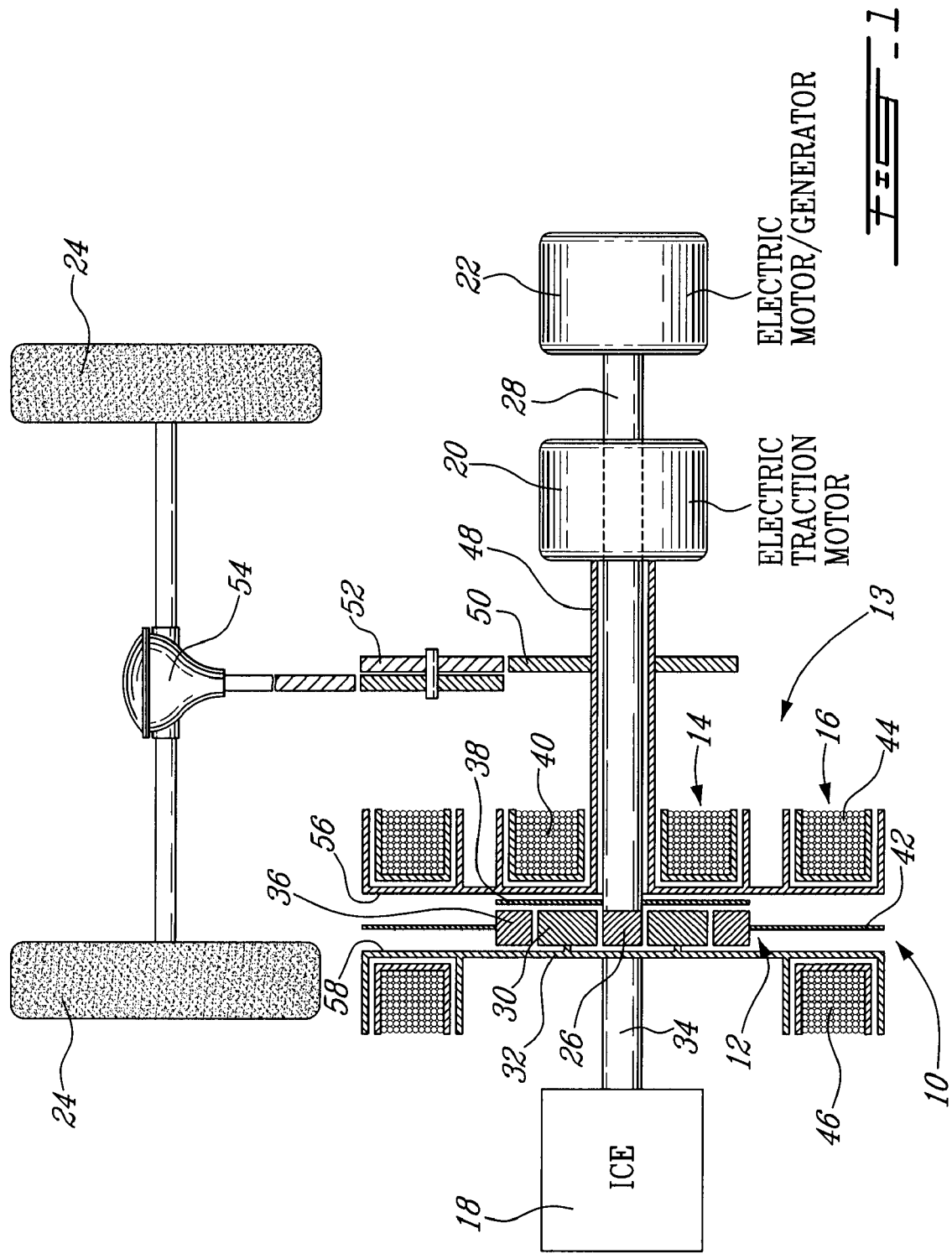
FIG. 1 is a schematic block diagram of a drive train of an hybrid vehicle including a hybrid transmission according to a first illustrative embodiment of the present invention, the hybrid transmission being shown in a neutral mode.

An object of the present invention is therefore to provide an improved hybrid transmission to interconnect the ICE, the electric traction motor, the electric motor/generator and at least one wheel of the hybrid vehicle.

More specifically, in accordance to an aspect of the present invention, there is provided a hybrid drive train for a vehicle provided with at least one driving wheel, the hybrid drive train comprising:

an electric traction motor having a rotatable shaft connected to the at least one driving wheel of the vehicle;

an electric motor/generator having a rotatable shaft;

an internal combustion engine having a rotatable shaft;

a planetary gear arrangement including a sun gear associated with the rotatable shaft of the electric motor/generator, a planet carrier associated with the rotatable shaft of the internal combustion engine and a ring gear;

a clutch assembly having a first movable element associated with the sun gear of the planetary gear arrangement, a second movable element associated with the ring gear of the planetary gear arrangement and a fixed element associated with the at least one driving wheel; the first movable element being movable between a first position where the first movable element is freewheeling and a second position where the first movable element is linked with the fixed element; the second movable element being movable between a first position where the second movable element is freewheeling and a second position where the second movable element is linked with the fixed element.

According to another aspect of the present invention, there is provided a hybrid drive train for a vehicle provided with at least one driving wheel, the hybrid drive train comprising:

an electric traction motor having a rotatable shaft connected to the at least one driving wheel of the vehicle;

an electric motor/generator having a rotatable shaft;

an internal combustion engine having a rotatable shaft;

a planetary gear arrangement including a sun gear associated with the rotatable shaft of the electric motor/generator, a planet carrier associated with the rotatable shaft of the internal combustion engine and a ring gear;

a clutch assembly having first and second movable elements associated with the ring gear of the planetary gear arrangement, a first fixed element associated with the at least one driving wheel and a second fixed element associated with rotatable shaft of the internal combustion engine; the first movable element being movable between a first position where the first movable element is freewheeling and a second position where the first movable element is linked with the first fixed element; the second movable element being movable between a first position where the second movable element is freewheeling and a second position where the second movable element is linked with the second fixed element.

Other objects, advantages and features of the present invention will become more apparent upon reading of the following non-restrictive description of preferred embodiments thereof, given by way of example only with reference to the accompanying drawings.

Turning now to FIG. 1 of the appended drawings, a hybrid transmission 10 according to a first embodiment of the present invention will be described. The hybrid transmission 10 is part of a drive train of a hybrid vehicle as shown in FIG.

1. It is to be noted that FIG. 1 is schematic, not to scale and that many elements of the drive train such as the bearings, rotation sensors and mounting brackets have been omitted for clarity purpose and since these elements are not particularly relevant to the present disclosure.

The hybrid transmission 10 comprises a planetary gear arrangement 12 (epicyclical gearing) and a clutch 13 including two electromagnetic clutch portions 14 and 16 used to interconnect an internal combustion engine (ICE) 18, an electric traction motor 20, an electric motor/generator 22 and driving wheels 24 of the drive train of a hybrid vehicle. This hybrid transmission allows various modes of operation as will be described hereinbelow.

The planetary gear arrangement 12 includes a sun gear 26 mounted to a shaft 28 of the electric motor/generator 22; planet gears 30 mounted to a planet carrier 32 connected to a rotatable shaft 34 of the ICE 18; and a ring gear 36. The operation of a planetary gear arrangement 12 is believed to be well known to those skilled in the art and will therefore not be repeated herein, for concision purposes.

As mentioned hereinabove, the clutch 13 includes two electromagnetic clutch portions 14 and 16. The first electromagnetic clutch portion 14 may be viewed as a two-position clutch and includes a movable element in the form of a movable disk 38 fixedly mounted to the shaft 28 for rotation therewith and an actuator in the form of a fixed electromagnetic coil 40. The movable disk 38 is shown in its neutral position in FIG. 1.

The second electromagnetic clutch portion 16 may be viewed as a three-position clutch and includes a movable element in the form of a movable disk 42 mounted to the ring gear 36 and second and third actuators in the form of fixed electromagnetic coils 44 and 46. The movable disk 42 is shown in its neutral position in FIG. 1.

The electric traction motor 20 includes a rotatable shaft 48 surrounding the rotatable shaft 28 of the electric motor/generator 22. In other words, the rotatable shafts 28 and 48 are concentric. The shaft 48 is connected to a gear 50 meshed with an intermediate gear 52, itself meshed with a differential arrangement 54 to which the wheels 24 are connected. The shaft 48 is also provided with a plate 56 which may be viewed as a part of the electromagnetic clutch portions 14 and 16 since the movable disks 38 and 42 may be frictionally engaged thereto as will be described hereinbelow.

The planet carrier 32 includes an engaging surface 58 which may be viewed as a part of the second electromagnetic clutch portion 16 since the movable disk 42 may be frictionally engaged thereto as will be described hereinbelow.

The hybrid transmission 10 is shown in its neutral mode in FIG. 1. More specifically, the electromagnetic clutch portions 14 and 16 are not engaged. In this mode, the electric traction motor 20 may be used to drive the wheels 24 of the vehicle since the shaft 48 of the motor 20 is permanently connected to the wheels 24. It is to be noted that the vehicle runs only on batteries (not shown) when the transmission 10 is in the neutral mode.

Figure 2:
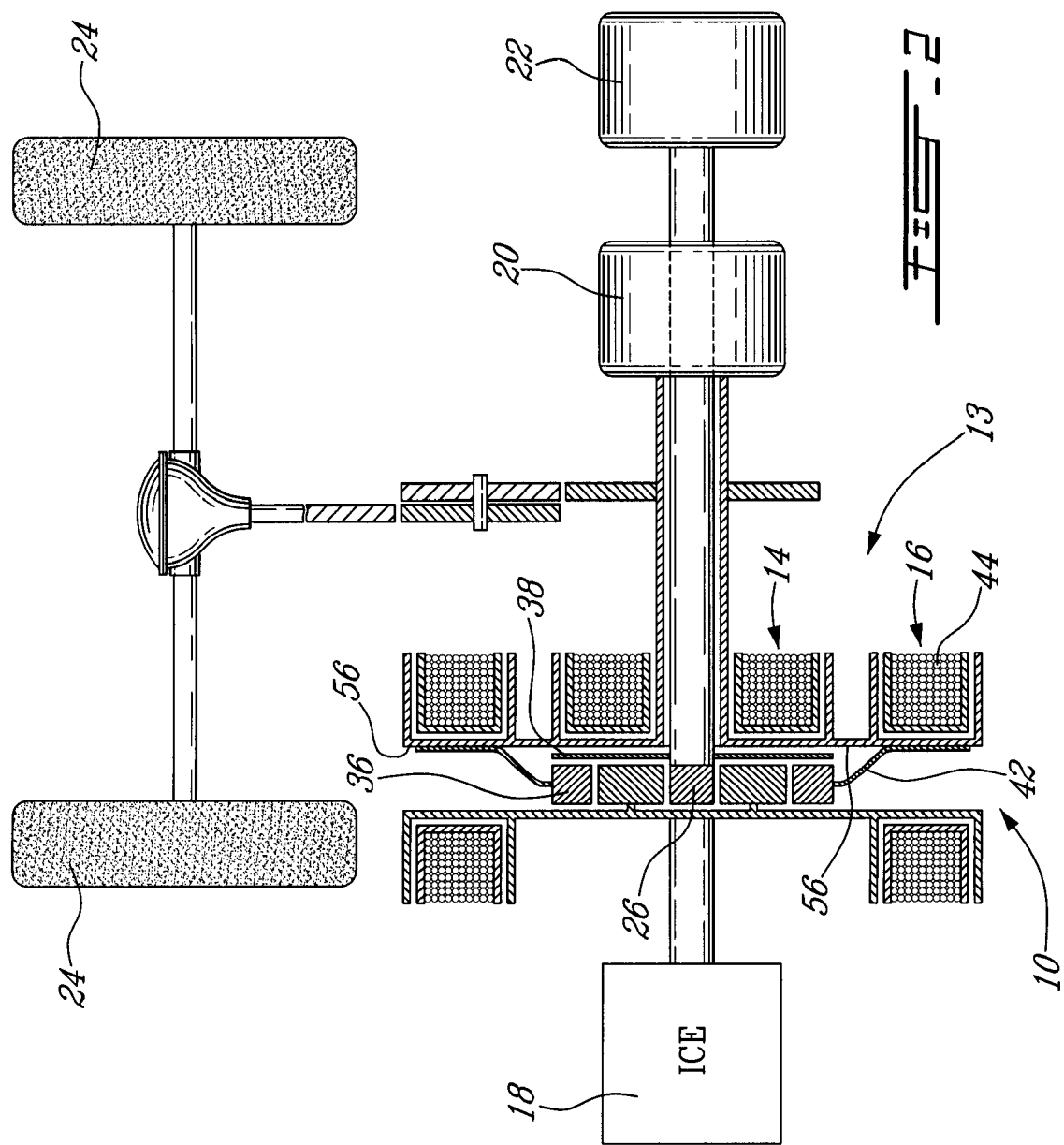
FIG. 2 is a schematic block diagram similar to FIG. 1 and illustrating the hybrid transmission in a parallel hybrid mode.

The hybrid transmission 10 is shown in its parallel hybrid mode in FIG. 2. More specifically, the movable disk 38 of the first electromagnetic clutch portion 14 is not engaged and the movable disk 42 of the second electromagnetic clutch portion 16 is engaged to the plate 56, therefore connecting the ring gear 36 to the wheels 24. This engagement is done by energizing the electromagnetic coil 44. When the hybrid transmission 10 is in this mode, a portion of the power generated by the ICE 18 is transferred to the wheels 24 of the vehicle. Via their interconnection through the planetary gear arrangement, the portion of the power transferred from the ICE 18 to the wheels 24 is controlled by the electric motor/generator 22. Indeed, the less resistance that is supplied to the sun gear 26 by the electric motor/generator 22, the less power will be transferred to the wheels 24.

This mode enables the ICE 18 to be used to gradually start the movement of the vehicle by gradually varying the resistance supplied by the electric motor/generator 22. Of course, one skilled in the art will easily understand that other parameters should be controlled to gradually start the movement of the vehicle. These parameters include, for example, the rotational speed and the developed power of the ICE 18, the rotational speed and direction of rotation of the motor generator 22.

It is also to be noted that when the hybrid transmission is in this mode, the electric traction motor 20 may participate in the powering of the vehicle (parallel hybrid) or not.

Figure 3:
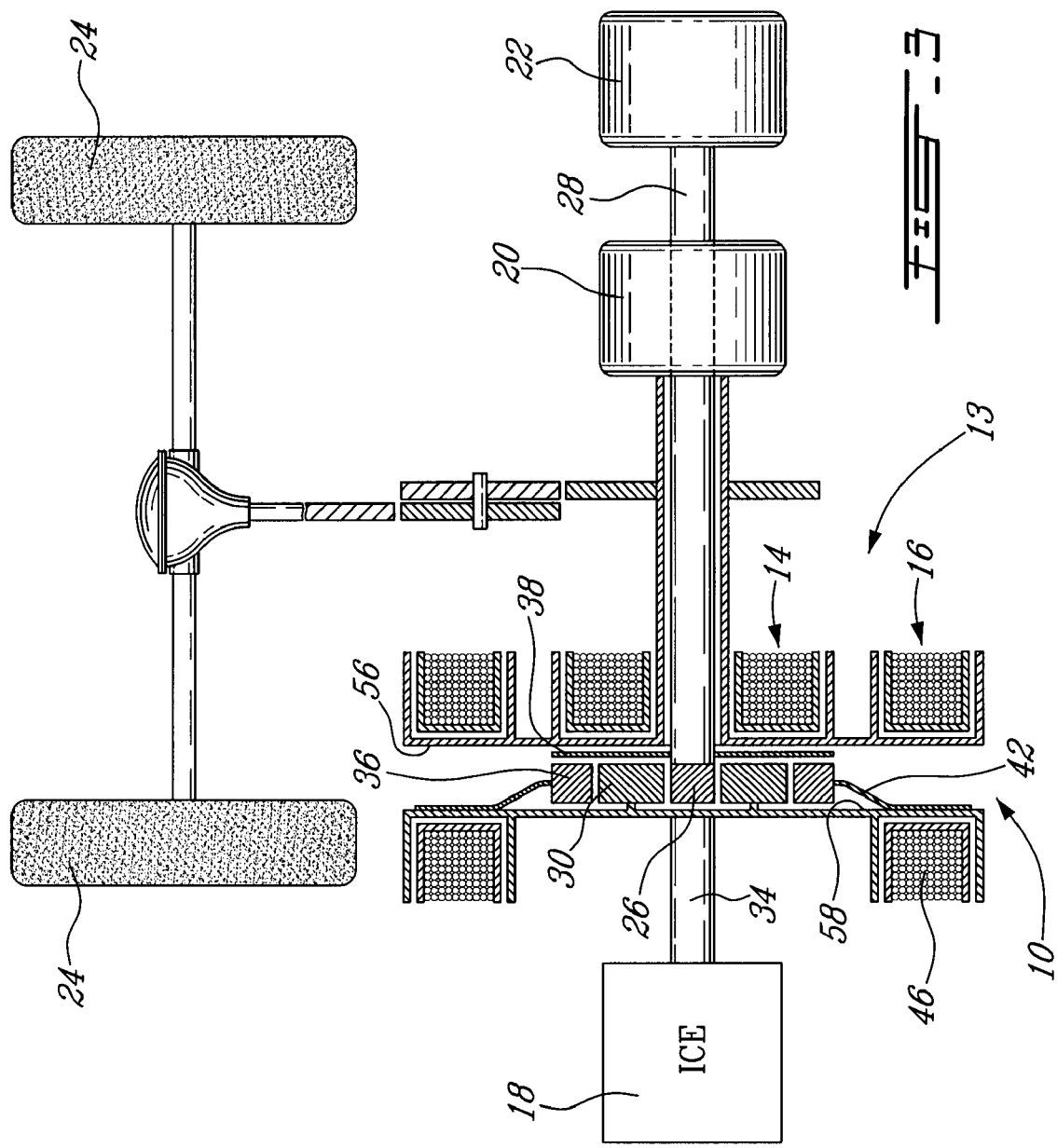
FIG. 3 is a schematic block diagram similar to FIG. 1 and illustrating the hybrid transmission in a series hybrid mode.

The hybrid transmission 10 is shown in its series hybrid mode in FIG. 3. More specifically, the movable disk 38 of the first electromagnetic clutch portion 14 is not engaged and the movable disk 42 of the second electromagnetic clutch portion 16 is engaged to the plate 58, connecting the ring gear 36 to the planet gears 30 and therefore to the ICE 18 via the shaft 34. This engagement is done by energizing the coil 46. Accordingly, the ring gear 36 rotates at the same speed as the planet gears 30 and as the sun gear 26. The entire power developed by the ICE 18 is therefore transferred to the sun gear 26 and therefore to the electric motor/generator 22 via the shaft 28. The electric motor/generator 22 may therefore be operated in a charging mode to recharge the batteries (not shown) of the vehicle and the electric traction motor 20 may be used to propel the vehicle.

Figure 4:
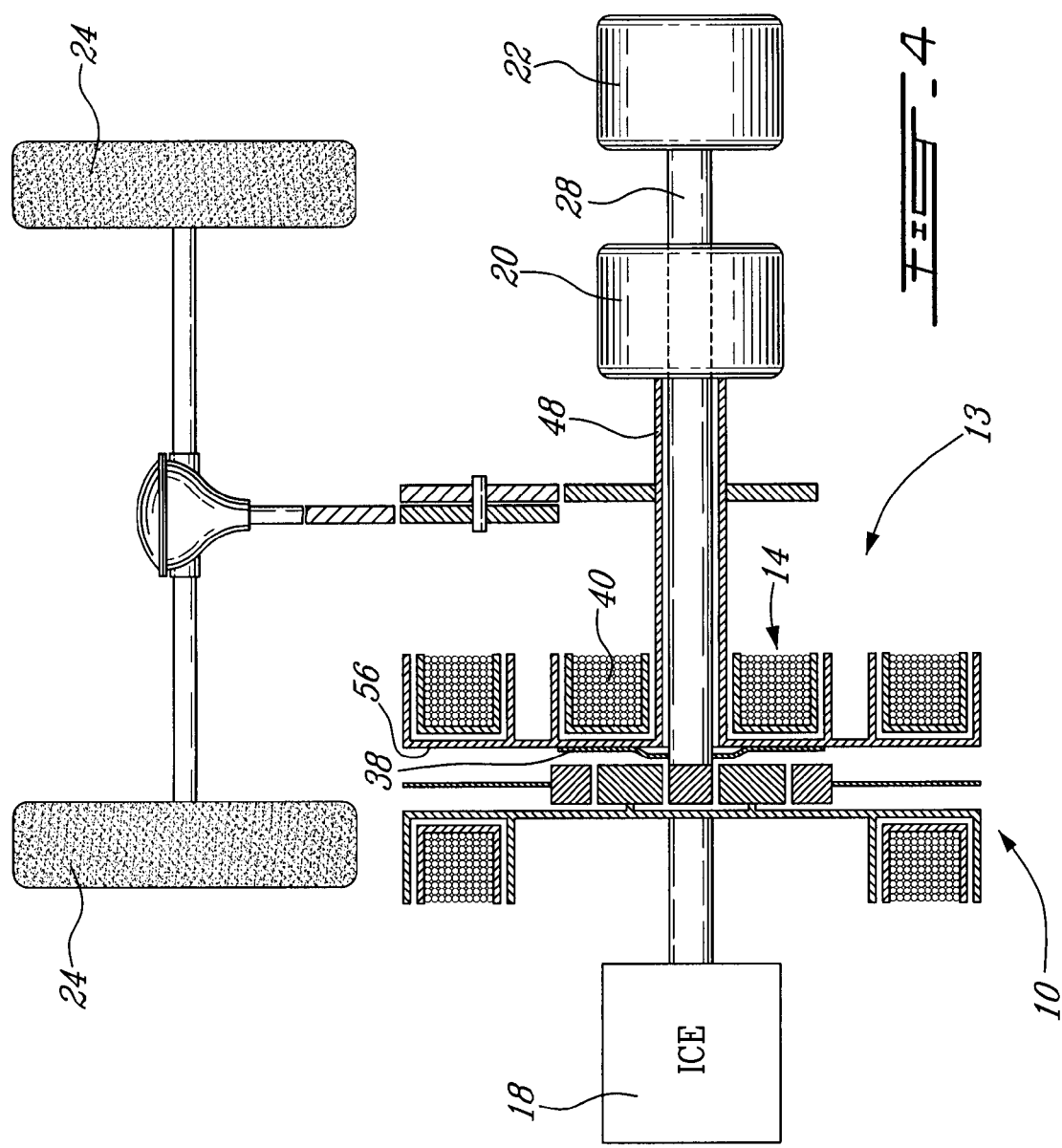
FIG. 4 is a schematic block diagram similar to FIG. 1 and illustrating the hybrid transmission in a purely electric mode where both the electric traction motor and the electric motor/generator supply mechanical power to the wheels.

The hybrid transmission 10 is shown in its purely electric mode in FIG. 4. More specifically, the movable disk 38 of the first electromagnetic clutch portion 14 is engaged to the plate 56, therefore interconnecting the shaft 28 of the electric motor/generator 22 to the shaft 48 of the electric traction motor 20. This interconnection is done by energizing the coil 40 of the second electromagnetic clutch portion 14. Both the electric traction motor 20 and the electric motor/generator 22 may therefore participate to power rotation of the wheels 24. This mode may also be used, for example, to slow down the vehicle and recharge the batteries (not shown) by placing the electric traction motor 20 and the electric motor/generator in a charging state. Another potential use of this mode is to climb a relatively steep hill without engaging the ICE 18.

Figure 5:
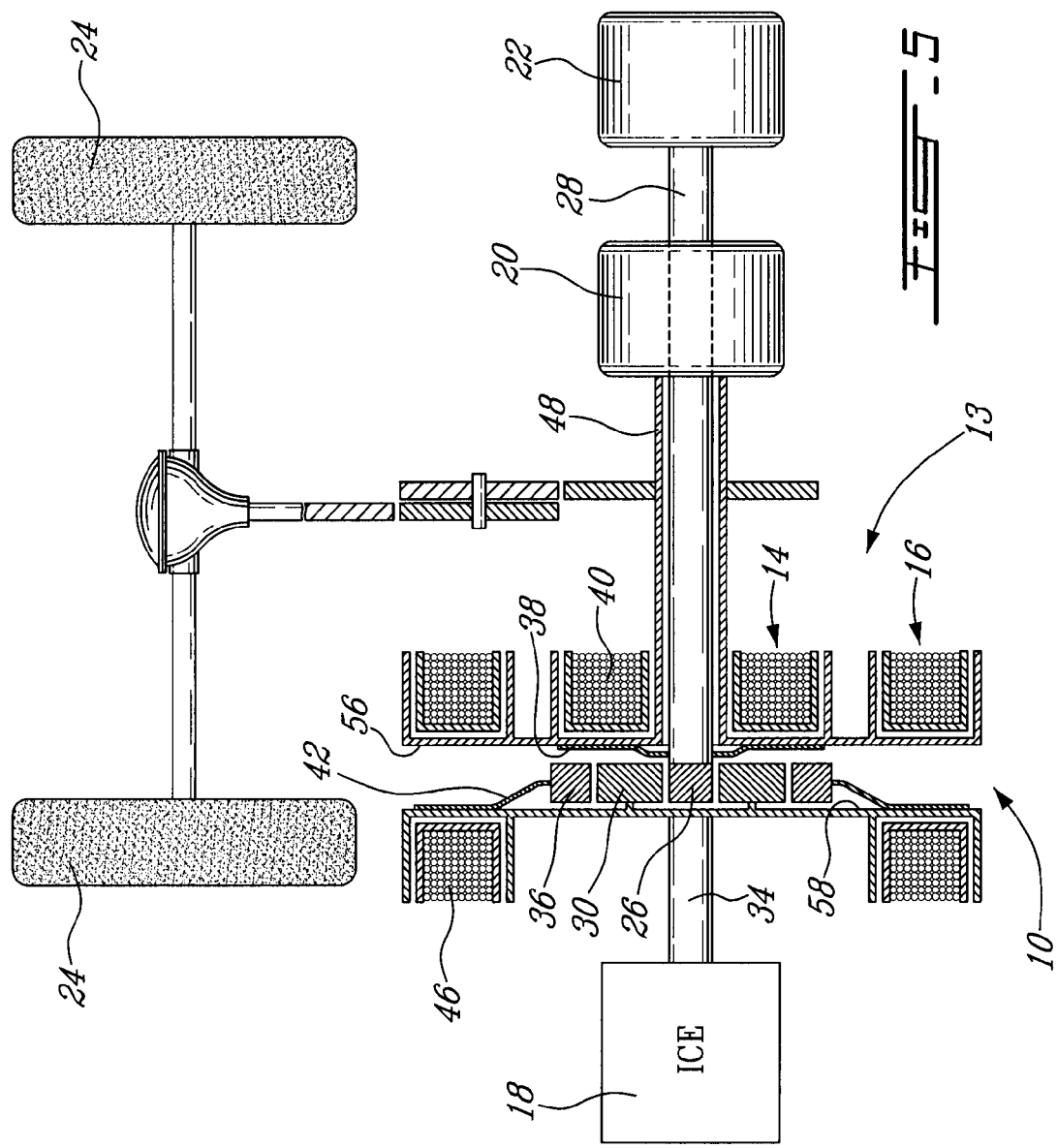
FIG. 5 is a schematic block diagram similar to FIG. 1 and illustrating the hybrid transmission in a series/parallel mode.

The hybrid transmission 10 is shown in its series/parallel hybrid mode in FIG. 5. More specifically, the movable disk 38 of the first electromagnetic clutch portion 14 is engaged to the plate 56, therefore interconnecting the shaft 28 of the electric motor/generator 22 to the shaft 48 of the electric traction motor 20. This interconnection is done by energizing the coil 40. The movable disk 42 of the second electromagnetic clutch portion 16 is engaged to the plate 58, connecting the ring gear 36 to the planet gears 30 and therefore to the ICE 18 via the shaft 34. This engagement is done by energizing the coil 46.

When the hybrid transmission 10 is in the series/parallel hybrid mode of FIG. 5, the ICE 18, the electric traction motor 20 and the electric motor/generator 22 may participate to power the wheels 24 of the vehicle. The electric motor/generator 22 may alternatively recharge the batteries (not shown) should it be placed in a charging state. Furthermore, the motor/generator 22 may be left freewheeling. It is to be noted that the same result could be achieved should the movable disk 42 of the second electromagnetic clutch portion 16 be engaged to the plate 56, connecting the ring gear 36 to the sun gear 26 via the plate 56. This could be interesting to let the movable disk 42 engaged to the plate 56 when the transmission is switched from the parallel hybrid mode of FIG. 2 to the series/parallel mode of FIG. 5.

It is also to be noted that when the hybrid transmission is in the series/parallel hybrid mode, the motor/generator 22 may be left free wheeling, i.e. that no power is generated nor used by the motor/generator 22. When this is the case, the power generated by the ICE 18 is transferred to the wheels 24.

One skilled in the art will understand that the switching between the hybrid transmission modes illustrated in FIGS. 1 to 5 may be done while the vehicle is in motion. However, to provide adequate operation of the vehicle, all the components of the hybrid drive train should be adequately controlled, for example by a common controller (not shown). As an example, the rotational speeds of the shafts 28 and 48 should be matched before the hybrid transmission is switched from its neutral mode of FIG. 1 to its purely electric mode of FIG. 4.

As an example of mode switching, when the vehicle is not in motion, the transmission 10 could be placed in the parallel mode of FIG. 2 to gradually impart motion to the vehicle via the ICE, the traction motor 20 and/or the motor/generator 22 and to bring the vehicle to the desired cruising speed. Once this speed is reached, the transmission 10 may be switched to the series/parallel mode of FIG. 5 to allow the ICE 18 drive the vehicle without contribution from the motor/generator 22. Of course, as mentioned hereinabove, the motor/generator 22 may also contribute to the traction or may recharge the batteries while in this mode.

Figure 6:
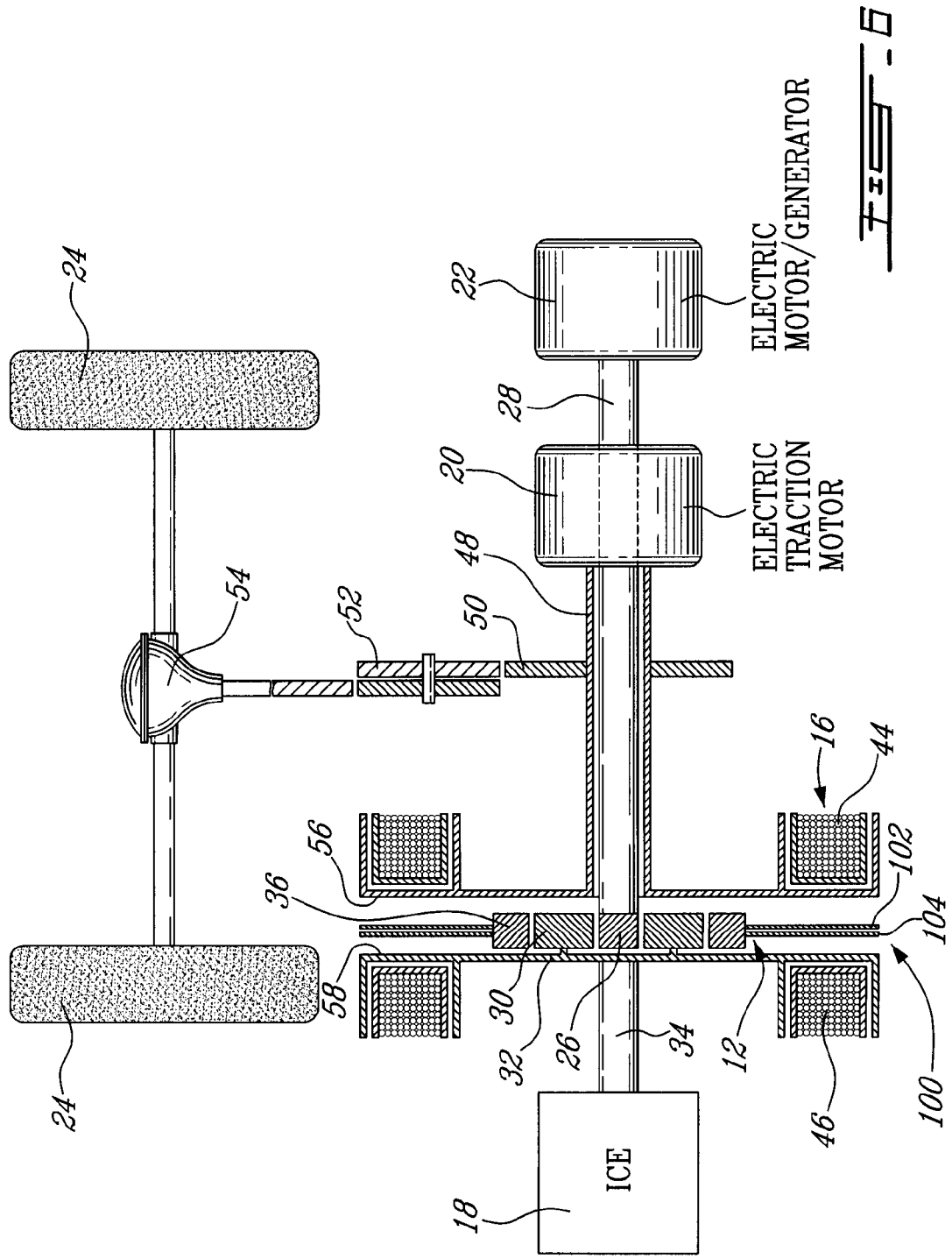
FIG. 6 of a drive train of an hybrid vehicle including a hybrid transmission according to a second illustrative embodiment of the present invention, the hybrid transmission being shown in a neutral mode.

Turning now to FIG. 6 of the appended drawings, a hybrid transmission 100 according to a second illustrative embodiment of the present invention will be described. It is to be noted that since the hybrid transmission 100 is very similar to the hybrid transmission 10 of FIGS. 1 to 5, only the differences between these transmissions will be discussed hereinbelow, for concision purpose. It is also to be noted that the same numeral are used to refer to the same elements.

A main difference between the transmission 100 of FIG. 6 and the transmission 10 of FIGS. 1 to 5 is that the first electromagnetic clutch portion 14 of transmission 10 is not present in transmission 100. Another difference is that the three-position clutch portion 16 of the transmission 10 has been provided with a double movable disk 102-104 associated with the ring gear 36 to yield a four position clutch. A first movable disk 102, shown in a neutral position in FIG. 6, may be engaged to surface 56 upon energization of the coil 44. Similarly, a second movable disk 104, shown in a neutral position in FIG. 6, may be engaged to surface 58 upon energization of the coil 46.

As will easily be understood by one skilled in the art, the transmission 100 may be positioned in a parallel hybrid mode upon energization of the coil 44, and in a series hybrid mode upon energization of the coil 46. Furthermore, should both coils 44 and 46 be energized, the ICE 18 is directly coupled to the wheels 24 without the intervention of the electric motor/generator 22. This direct coupling may be interesting for highway cruising, for example.

Figure 7:
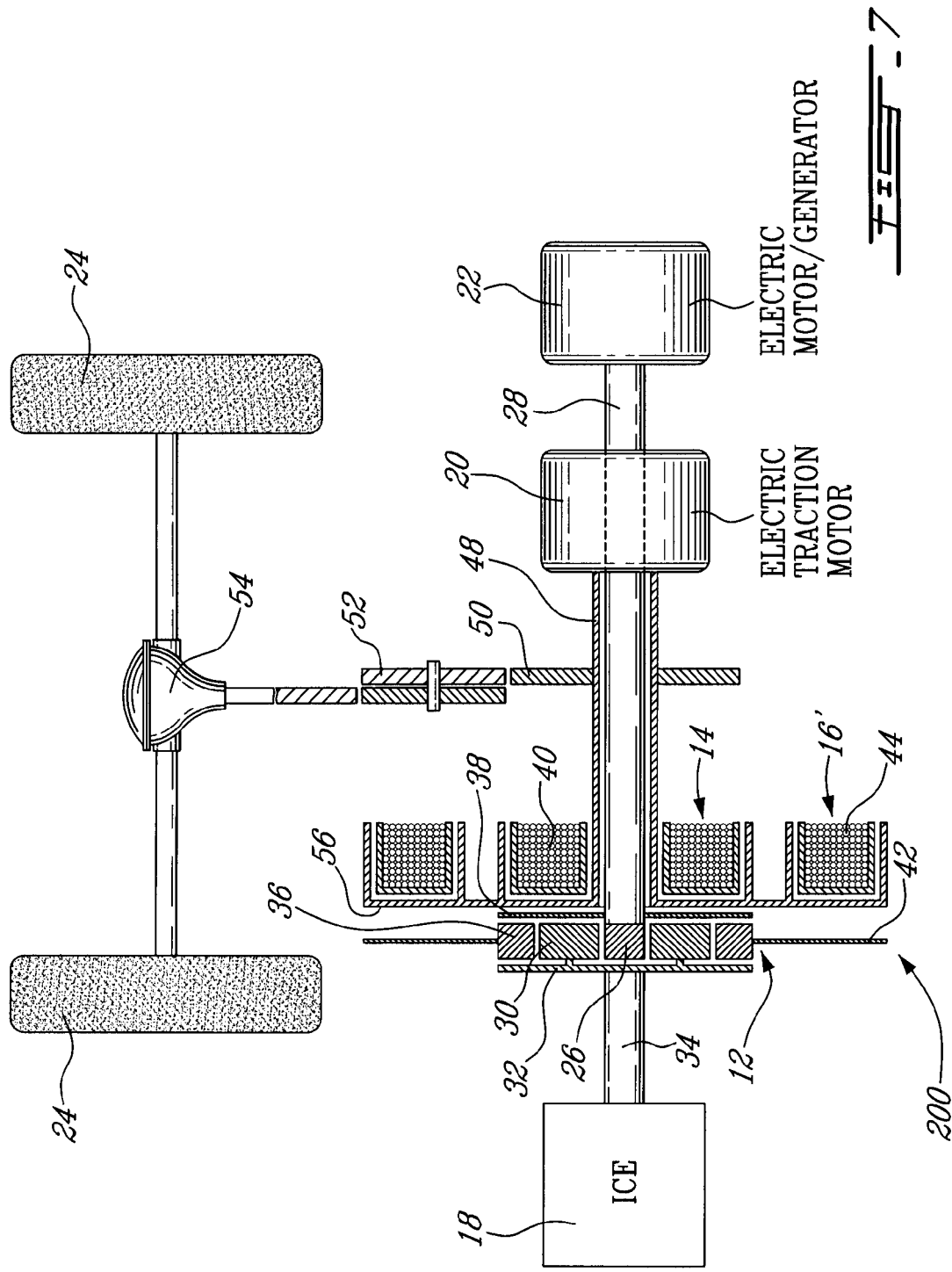
FIG. 7 of a drive train of an hybrid vehicle including a hybrid transmission according to a third illustrative embodiment of the present invention, the hybrid transmission being shown in a neutral mode

Turning now to FIG. 7 of the appended drawings, a hybrid transmission 200 according to a third illustrative embodiment of the present invention will be described. It is to be noted that since the hybrid transmission 200 is very similar to the hybrid transmission 10 of FIGS. 1 to 5, only the differences between these transmissions will be discussed hereinbelow, for concision purpose. It is also to be noted that the same numeral are used to refer to the same elements.

A main difference between the transmission 200 of FIG. 7 and the transmission 10 of FIGS. 1 to 5 is that the coil 46 of the three-position second electromagnetic clutch portion 16 of transmission 10 is not present in transmission 100 to yield a two-position clutch portion 16'.

As will easily be understood by one skilled in the art, the transmission 200 may be positioned in a parallel hybrid mode upon energization of the coil 44, and in a purely electric mode upon energization of the coil 40. In this mode, the electric motor/generator 22 may be placed either in a generator mode or a motor mode depending of the conditions and requirements of the vehicle.

Furthermore, should both coils 44 and 40 be energized, the hybrid transmission 200 is placed in a series/parallel hybrid mode.

It is to be noted that the appended drawings are very schematic and that other elements are required to adequately operate the hybrid transmission 10 and its associated hybrid vehicle. For example, having a controller (not shown) having user controls (not shown) and connections to the various elements of the hybrid transmission 10 and to the ICE, the electric traction motor 20 and the electric motor/generator 22 is advantageous.

It is also to be noted that even though the above description refers to magnetic clutches including electromagnetic coils as actuators, other types of clutches, such as, for example, jaw clutches, could be used. Of course, when magnetic clutch portions are used, the movable elements 38 and 42 advantageously contain magnetically susceptible material so as to adequately cooperate with the actuators.

While three separate illustrative embodiments have been illustrated and described herein, it is to be noted that the features of these embodiments could be mixed.

It is to be understood that the invention is not limited in its application to the details of construction and parts illustrated in the accompanying drawings and described hereinabove. The invention is capable of other embodiments and of being practiced in various ways. It is also to be understood that the phraseology or terminology used herein is for the purpose of description and not limitation. Hence, although the present invention has been described hereinabove by way of illustrative embodiments thereof, it can be modified, without departing from the spirit, scope and nature of the subject invention as defined in the appended claims.

What is claimed is:
1. A hybrid drive train for a vehicle provided with at least one driving wheel, the hybrid drive train comprising:
  an electric traction motor having a rotatable shaft connected to the at least one driving wheel of the vehicle;
  an electric motor/generator having a rotatable shaft;
  an internal combustion engine having a rotatable shaft;
  a planetary gear arrangement including a sun gear associated with the rotatable shaft of the electric motor/generator, a planet carrier associated with the rotatable shaft of the internal combustion engine and a ring gear;
  a clutch assembly having a first movable element associated with the sun gear of the planetary gear arrangement, a second movable element associated with the ring gear of the planetary gear arrangement and a plate mounted to the rotatable shaft of the electric traction motor; the first movable element being movable between a first position where the first movable element is freewheeling and a second position where the first movable element is linked with the plate; the second movable element being movable between a first position where the second movable element is freewheeling and a second position where the second movable element is linked with the plate; the clutch assembly further comprising first and second actuators respectively configured as to selec- tively move the first and second movable elements between their respective first and second positions.

2. A hybrid drive train as recited in claim 1, wherein the rotatable shaft of the electric traction motor is connected to the at least one driving wheel of the vehicle by a differential arrangement.

3. A hybrid drive train as recited in claim 1, wherein the rotatable shaft of the electric motor/generator and the rotatable shaft of the traction motor are concentric.

4. A hybrid drive train as recited in claim 1, wherein the first actuator includes an electromagnetic coil and wherein the first movable element includes magnetically susceptible material.

5. A hybrid drive train as recited in claim 1, wherein the second actuator includes an electromagnetic coil and wherein the second movable element includes magnetically susceptible material.

6. A hybrid drive train for a vehicle provided with at least one driving wheel, the hybrid drive train comprising:
   an electric traction motor having a rotatable shaft connected to the at least one driving wheel of the vehicle;
   an electric motor/generator having a rotatable shaft;
   an internal combustion engine having a rotatable shaft;
   a planetary gear arrangement including a sun gear associated with the rotatable shaft of the electric motor/generator, a planet carrier associated with the rotatable shaft of the internal combustion engine and a ring gear;
   a clutch assembly having a first movable element associated with the sun gear of the planetary gear arrangement, a second movable element associated with the ring gear of the planetary gear arrangement and a longitudinally fixed element associated with the at least one driving wheel; the first movable element being movable between a first position where the first movable element is freewheeling and a second position where the first movable element is linked with the longitudinally fixed element; the second movable element being movable between a first position where the second movable element is freewheeling and a second position where the second movable element is linked with the longitudinally fixed element, wherein the clutch assembly further includes a second longitudinally fixed element associated with the rotatable shaft of the internal combustion engine; the second movable element of the clutch assembly being movable between the first, the second and a third position where the second movable element is linked with the second longitudinally fixed element.

7. A hybrid drive train as recited in claim 6, wherein the second longitudinally fixed element is defined by a plate mounted to the rotatable shaft of the internal combustion engine.

8. A hybrid drive train as recited in claim 6, wherein the clutch assembly is provided with a third actuator so configured and sized as to selectively move the second movable element between the first, second and third positions.

9. A hybrid drive train as recited in claim 8, wherein the third actuator includes first and second electromagnetic coils and wherein the second movable element includes magnetically susceptible material.

10. A hybrid drive train as recited in claim 9, wherein the first electromagnetic coil is associated with the longitudinally fixed element and the second electromagnetic coil is associated with the second longitudinally fixed element.

11. A hybrid drive train for a vehicle provided with at least one driving wheel, the hybrid drive train comprising:
    an electric traction motor having a rotatable shaft connected to the at least one driving wheel of the vehicle;
    an electric motor/generator having a rotatable shaft;
    an internal combustion engine having a rotatable shaft;
    a planetary gear arrangement including a sun gear associated with the rotatable shaft of the electric motor/generator, a planet carrier associated with the rotatable shaft of the internal combustion engine and a ring gear;
    a clutch assembly having first and second movable elements associated with the ring gear of the planetary gear arrangement, a first plate associated with the rotatable shaft of the electric traction motor and a second plate associated with rotatable shaft of the internal combustion engine; the first movable element being movable between a first position where the first movable element is freewheeling and a second position where the first movable element is linked with the first plate; the second movable element being movable between a first position where the second movable element is freewheeling and a second position where the second movable element is linked with the second plate; the clutch assembly further comprising first and second actuators respectively configured as to selectively move the first and second movable elements between their respective first and second positions.

12. A hybrid drive train as recited in claim 11, wherein the first actuator includes a first electromagnetic coil and wherein the first movable element includes magnetically susceptible material.

13. A hybrid drive train as recited in claim 12, wherein the first electromagnetic coil is associated with the first plate.

14. A hybrid drive train as recited in claim 11, wherein the second actuator includes a second electromagnetic coil and wherein the second movable element includes magnetically susceptible material.

15. A hybrid drive train as recited in claim 14, wherein the second electromagnetic coil is associated with the second plate.

* * * * *